Sept. 8, 1942.   P. B. DAVIS   2,295,031
COOLING APPARATUS FOR ELECTRIC LAMPS
Filed Aug. 3, 1940
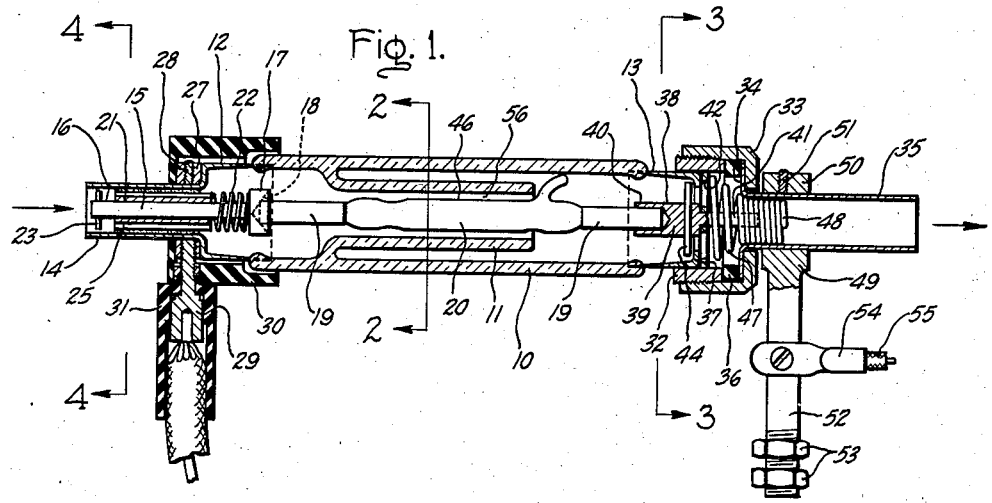
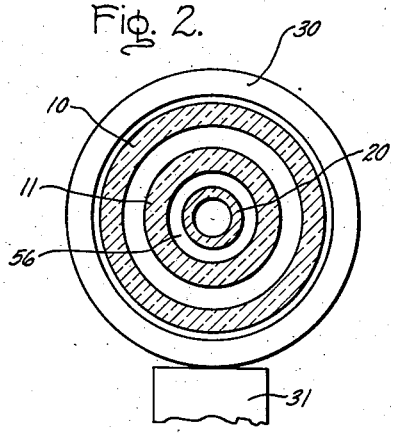
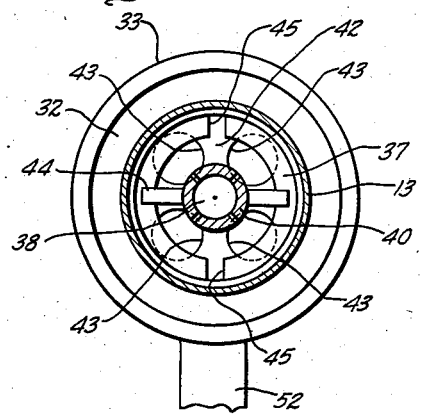
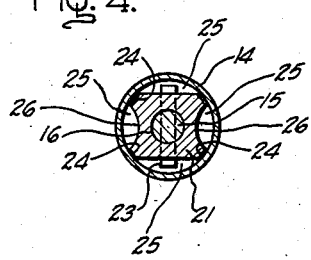
Inventor:
Paul B. Davis,
by John H Anderson
His Attorney.

Patented Sept. 8, 1942

2,295,031

UNITED STATES PATENT OFFICE 2,295,031

COOLING APPARATUS FOR ELECTRIC LAMPS

Paul B. Davis, East Cleveland, Ohio, assignor to General Electric Company, a corporation of New York Application August 3, 1940, Serial No. 350,885

7 Claims. (Cl. 240—11.4)

My invention relates in general to high intensity light sources particularly of the small high-pressure mercury arc type, such as described and claimed in U. S. Patent No. 2,094,694, Cornelis Bol et al., issued October 5, 1937, and assigned to the assignee of the present invention. More particularly, my invention relates to a water-cooling arrangement or jacket for one of such lamps.

High-pressure mercury vapor lamps of the type referred to above are provided with relatively small quartz tubes of the order of 40 mm. or so in length and having an outside diameter of about 6 mm. and a bore of about 2 mm. In lamps of such small volume operating with relatively high power inputs of the order of 800 to 1000 watts and above, it is necessary to effectively cool the lamp in order to dissipate the relatively large energy input within the small bulb volume and prevent softening of the lamp bulb. It is not sufficient merely to place the lamp in a bath of water. Instead, the water must be passed over the lamp with enough velocity to prevent the formation of steam bubbles on the surface of the quartz bulb. Steam bubbles do not conduct away the heat fast enough to prevent overheating of the lamp, so that their presence may result in the early failure of the lamp.

One object of my invention is to provide an improved liquid-cooling single-unit mounting arrangement for small tubular electric lamps which is simple in construction and effective in operation.

Another object of my invention is to provide a liquid-cooling single-unit mounting arrangement for small tubular electric lamps which will permit easy replacement of the lamp upon failure of the same.

Further objects and advantages of my invention will appear from the following description of species thereof and from the accompanying drawing in which:

Fig. 1 is a longitudinal section of a liquid-cooling single-unit mounting arrangement comprising my invention; and Figs. 2, 3 and 4 are transverse sections on the lines 2—2, 3—3, and 4—4 respectively, on an enlarged scale.

Referring to the drawing, the liquid-cooling device there shown comprises a cylindrical jacket or tube 10 of light transmitting heat-resisting material, preferably of glass such as that commercially known as "Pyrex." The said glass tube 10 is provided with an inner velocity tube 11, also of a heat-resisting glass, which is disposed concentrically within and spaced from the outer tube 10. One end of the said inner tube 11 is sealed to the outer tube 10 at a point adjacent the water intake end of the latter.

Secured to the intake and outlet ends respectively of the glass tube 10 are a copper thimble 12 and a copper collar 13. The said thimble 12 and collar 13 are sealed by fusion to the ends of the glass tube 10 in accordance with the disclosure in U. S. Patent No. 1,294,466, Housekeeper, issued February 18, 1919. Such a glass-to-metal seal thus provides a positive water-tight connection between the glass tube 10 and the thimble 12 and collar 13.

The thimble 12 is provided with an outwardly extending integral intake tube 14 of reduced diameter and disposed in axial alignment with the glass tube 10. Secured within the copper intake tube 14 is a resilient lamp contact 15 comprising a brass plunger 16 having at its innermost end a head 17 provided with a conical seat or socket 18 in which a terminal 19 of the lamp 20 is received. Said contact 15 further comprises a brass sleeve or socket support member 21 secured to the intake tube 14 and through which the plunger 16 slidably extends, and a stainless steel helical compression spring 22 concentrically mounted on the plunger 16 between the head 17 thereof and the inner end of the sleeve 21. At its outer end, the plunger is provided with a transversely extending stop pin 23 which abuts against the outer end of sleeve 21 to thereby lock the plunger within the said sleeve. As shown particularly in Fig. 4, the sleeve 21 is made from a bar of rectangular cross-section the corners of which are ground flat, as indicated at 24, so as to fit tightly against the inner wall of the intake tube 14. To insure that the sleeve 21 is positively secured in place in the intake tube 14, the flattened corners 24 of the sleeve are preferably soldered to the said tube. The spaces 25 between the sides of the sleeve 21 and the surrounding intake tube 14 provide ample passageways for the flow of the cooling liquid through the intake tube into the glass tube 10 surrounding the lamp. However, the narrower sides 26 of the sleeve 21 are preferably formed concave, as shown in Fig. 4, to thereby increase the cross-section of the spaces between such sides and the intake tube 14.

Electrical connection to the resilient contact 15 is made by means of a brass connector ring 27 fitting on the intake tube 14 against the thimble 12 thereof and secured in place on said tube 14 by a plurality of set screws 28, and a brass terminal connector 29 threaded into the said connector ring 27. To prevent any possibility of electrical shock, the metal thimble 12 and connector ring 27 are enclosed in an insulating cap 30, and the terminal connector 29 encased in an insulating bushing 31. The cap 30 is secured to the conector ring 27, and the bushing 31 to the cap 30, by means of the threaded terminal connector 29. The exposed portion of the metal intake tube 14 extending out beyond the cap 30 is enclosed by the rubber water-inlet hose (not shown) during the operation of the device, thus completing the insulation of all the metal parts at the intake end of the device.

Surrounding the outer end of the copper collar 13 at the outlet end of the device is a brass sleeve 32 which is soldered to the copper collar 13 so as to provide a water-tight connection therebetween. The outer periphery of the brass sleeve 32 is threaded for engagement with a knurled brass closure cap 33 which engages an outwardly turned flange 34 on an outlet tube 35 and presses the same against a rubber gasket 36 inserted between the sleeve 32 and the flange 34, thus securing the outlet tube 35 in place and providing a water-tight connection between the said tube 35 and the brass sleeve 32.

The outer end of the copper collar 13 is formed with an inturned annular flange 37 (Fig. 3) on which a stationary lamp contact 38 is mounted. The said contact 38 comprises a brass stem 39 having a longitudinally slotted socket portion 40 at its inner end in which the lamp terminal 19 is securely held, and a stud portion 41 of reduced diameter extending outwardly from the socket portion 40. Secured on said stud portion 41 by a press fit and resting against the socket portion 40 is a perforated contact mounting disc 42. The said disc seats on the annular flange 37 on the collar 13, and is provided with a plurality of circular openings 43, preferably four in number and arranged in a circle about the center of the disc. The said openings 43 provide passageways between the interior of the glass tube 10 and the outlet tube 35 through which the cooling liquid can pass. The socket portion 40 of the stationary contact 38 is provided with a transverse locking lug or pin 44 which is spaced inwardly from the disc 42 a distance slightly greater than the thickness of the annular flange 37 so that the latter can enter the space between the said lug and the disc 42. As shown particularly in Fig. 3, the annular flange 37 is provided with diametrically opposite radial slots or notches 45 through which the locking pin 44 is inserted during the mounting of the stationary contact 38 on the annular flange 37 of the copper collar 13.

Mounted centrally within the glass tube 10 and extending through the velocity tube 11 is a high-pressure mercury vapor lamp 20 of the capillary type, such as described and claimed in the aforesaid Bol et al. Patent No. 2,094,694 and comprising a cylindrical quartz bulb 46 having cylindrical metal terminals 19 at each end. The said terminals 19 are mounted between the resilient and stationary sockets 18 and 40 respectively, the latter being so spaced, when the device is completely assembled, as to cause a compression of the spring 22 of the resilient lamp contact 15. In this manner a good electrical contact is insured at all times between the socket 18 and the associated lamp terminal 19.

To insure a good electrical connection at all times between the stationary lamp contact 38 and the brass outlet tube 35 to which electrical connection is made, the inner end of the outlet tube 35 is provided with a truncated conical helical compression spring 47, of stainless steel, extending inwardly from the said tube 35 and engaging the disc 42 of the stationary contact 38. At its outer end, the spring 47 is provided with a cylindrical closed-wound portion 48 which extends into the outlet tube 35 and tightly fits within the same so as to be securely held therein. When the closure cap 33 is screwed down onto the brass sleeve 32 so as to secure the outlet tube 35 thereto, the conical spring 47 engages the disc 42 and is compressed by the inward movement of the outlet tube. The compressive force of spring 47 being greater than that of the spring 22 in the resilient lamp contact 15, the disc 42 is forced against the annular flange 37 with considerable pressure. The result is that a good contact is provided between the stationary contact 38 and the brass outlet tube 35 at all times.

Electrical connection to the outlet tube 35 is made by a combination mounting support and connector member 49 of brass comprising a collar 50 fitting around the outlet tube and secured thereto by a plurality of set screws 51, and a support arm 52 extending transversely therefrom and threaded at its outer end for engagement with mounting nuts 53. Screwed to the arm 52 is a terminal lug 54 to which the lead 55 from the current source is soldered. The mounting support 49 is preferably secured to the outlet tube 35 in a position with the collar 50 against the closure cap 33 so as to lock the cap between the said collar and the flange 34 of the outlet tube 35.

To assemble the lamp 20 within the device, one end terminal 19 of the lamp is inserted in the slotted socket 40 of the stationary contact 38 after which the lamp, together with the attached contact 38, is introduced into the glass tube 10 through the open outlet end thereof with the free lamp end terminal first so that the latter engages the conical socket 18 in the resilient lamp contact 15. Then with the locking pin 44 in alignment with the notches 45 in the annular flange 37, the lamp and its attached contact 38 are moved inwardly a still further amount against the resistance of the compression spring 22 of the resilient contact 15 until the locking pin passes through the said notches 45, after which the stationary contact is rotated a slight amount one way or the other, preferably 90° or thereabouts, so that the locking pin underlies the annular flange 37, as shown in Fig. 3, and is pressed thereagainst by the recoiling action of spring 22. The closure cap 33, with the attached outlet tube 35, is then screwed down tight onto the brass sleeve 32 so as to complete the assemblage. From the above, it is evident that the construction according to the invention affords easy access to the device for changing lamps in case of a failure thereof.

The velocity tube 11 is made of such a diameter as to provide a relatively small radial clearance 56 (Fig. 2) from the lamp 20 of about 1 mm. or thereabouts through which the cooling water must flow. Because of this restricted cross-section of the cooling water, the electrical conductivity thereof between the exposed lamp terminals 19 is kept at a relatively low value insufficient to cause any material interference with the proper operation of the lamp. Thus, where a 1000 watt lamp is enclosed by a velocity tube 11 providing an annular space of about 1 mm. around the lamp, the current through the cooling water is only about 10 to 25 milliamperes. The use of the velocity tube 11 thus permits the exposure of both terminals 19 of the lamp 20 to the cooling liquid and consequently permits the use of the easily interchangeable lamp mounting arrangement disclosed hereinabove.

The velocity tube also serves to impart a relatively high velocity to the cooling water. Because of the restricted annular cross-section of the cooling water, more than ample water velocity is attained to prevent the undesirable formation of steam bubbles with a water flow of about three liters per minute. Thus, with an annular passage about one millimeter wide around a 1000 watt lamp, a water flow of about three liters per minute gives ample velocity and a temperature rise less than 3° C. The use of the velocity tube 11 thus has made it possible to use a smaller amount of cooling water than that heretofore necessary to effectively cool a given lamp, because it is not the amount of water, but merely the surface velocity that matters. The criterion for proper cooling is that the speed of flow should be great enough to prevent the formation of any steam bubbles.

In the operation of the device, the intake and outlet tubes 14 and 35 respectively are connected to rubber inlet and outlet hoses (not shown) for the cooling liquid. After the flow of the cooling liquid through the device is initiated, the electrical circuit through the lamp 20 may then be closed so as to start the operation thereof.

What I claim as new and desire to secure by Letters Patent of the United States is:

1. A liquid-cooling mounting device for a high intensity tubular electric lamp comprising a tubular glass jacket through which the cooling liquid is adapted to be circulated, cylindrical metal sleeves sealed by fusion to the opposite ends of said glass jacket, and a pair of opposed lamp sockets supported by said metal sleeves in such a manner as to leave passages through said sleeves for flow of the cooling liquid therethrough.

2. A liquid-cooling mounting device for a high intensity tubular electric lamp comprising a tubular glass jacket through which the cooling liquid is adapted to be circulated, cylindrical metal elements sealed by fusion to the opposite ends of said glass jacket, a pair of opposed lamp sockets supported by said metal elements and centrally located therein, and a glass velocity tube disposed centrally within the said glass jacket and sealed at one end to said glass jacket by fusion so as to close off the annular space between said velocity tube and said tubular glass jacket, said velocity tube closely surrounding the lamp for the greater part of its length.

3. A liquid-cooling mounting device for a high intensity tubular electric lamp comprising a tubular glass jacket through which the cooling liquid is adapted to be circulated, and cylindrical metal sleeves sealed by fusion to the opposite ends of said glass jacket, one of said metal sleeves carrying a readily detachable closure cap and being provided with support means for a lamp socket so mounted in said sleeve as to leave a passage therethrough for flow of cooling liquid, said lamp socket firmly gripping the lamp and being readily disengageable from said support means for withdrawal from the jacket, and a second socket mounted within the other metal sleeve in such a manner as to leave a passage therethrough for flow of cooling liquid.

4. A liquid-cooling mounting device for high intensity tubular electric lamps comprising a tubular glass jacket through which the cooling liquid is adapted to be circulated, metal sleeves sealed by fusion to the opposite ends of said glass jacket and each provided with a tubular extension communicating with the interior of said glass jacket and through which the cooling liquid is circulated into and out of said glass jacket, and a pair of opposed lamp sockets disposed within said device at the opposite ends thereof, at least one of said sockets being removably mounted on that metal sleeve at the corresponding end of said device in such a manner as to leave a passage therethrough for flow of cooling liquid.

5. A liquid-cooling mounting device for high intensity tubular electric lamps comprising a tubular glass jacket through which the cooling liquid is adapted to be circulated, metal sleeves sealed by fusion to the opposite ends of said glass jacket, one of said metal sleeves having a tubular extension integral therewith and the other of said sleeves having a similar tubular extension separable therefrom, said extensions communicating with the interior of said glass jacket for the passage of the cooling liquid thereinto and therefrom, and means co-operating with the said other metal sleeve for securing said separable extension to the said other metal sleeve so as to form a liquid-tight joint therebetween, a fixed socket mounted in said first-mentioned metal sleeve, and a second socket removably mounted in the said other sleeve.

6. A liquid-cooling mounting device for high intensity tubular electric lamps comprising a tubular glass jacket through which the cooling liquid is adapted to be circulated, metal elements sealed by fusion to the opposite ends of said glass jacket and each provided with a tubular extension communicating with the interior of said glass jacket and through which the cooling liquid is circulated into and out of said glass jacket, and a pair of opposed sockets disposed within said device at the opposite ends thereof, at least one of said sockets comprising a socket support member disposed within that tubular extension at the corresponding end of said device and rigidly secured to said extension so as to form an integral part therewith, said socket support member having at least one of its sides spaced from the inner wall of said tubular extension so as to provide a passageway for the flow of the cooling liquid through said extension.

7. A liquid-cooling mounting for an elongated electric lamp having a contact terminal at each end, comprising a tubular glass jacket, a metal sleeve member at one end of said jacket having one of its ends fused directly to said jacket, a socket member mounted in said sleeve member in such manner as to leave a passage through the sleeve member for flow of cooling liquid, a second metal sleeve member at the other end of said jacket having one of its ends fused directly to said jacket, a second socket member mounted within said second sleeve member in a readily removable manner so that the said second socket member and the lamp are readily removable through the said second sleeve member, said second socket member also being so moun'ed as to leave a passage through said second sleeve member for flow of cooling liquid, and a cap member removably carried by said second sleeve member and carrying a tubular conduit member forming a passage for cooling liquid communicating with the passage through said second sleeve member.

PAUL B. DAVIS.